(12) United States Patent
Sudo et al.

(10) Patent No.: US 11,469,408 B2
(45) Date of Patent: Oct. 11, 2022

(54) ELECTRODE AND SECONDARY BATTERY

(71) Applicant: NEC CORPORATION, Tokyo (JP)

(72) Inventors: Shinya Sudo, Tokyo (JP); Kazuhiko Inoue, Tokyo (JP); Noboru Yoshida, Tokyo (JP); Makihiro Otohata, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/337,620

(22) PCT Filed: Sep. 27, 2017

(86) PCT No.: PCT/JP2017/034938
§ 371 (c)(1),
(2) Date: Mar. 28, 2019

(87) PCT Pub. No.: WO2018/062264
PCT Pub. Date: Apr. 5, 2018

(65) Prior Publication Data
US 2019/0348665 A1 Nov. 14, 2019

(30) Foreign Application Priority Data
Sep. 29, 2016 (JP) .............................. JP2016-191994

(51) Int. Cl.
*H01M 4/13* (2010.01)
*H01M 4/02* (2006.01)
*H01M 4/36* (2006.01)
*H01M 10/0525* (2010.01)
*H01M 4/86* (2006.01)

(52) U.S. Cl.
CPC .............. *H01M 4/13* (2013.01); *H01M 4/366* (2013.01); *H01M 4/8657* (2013.01);
(Continued)

(58) Field of Classification Search
None
See application file for complete search history.

(56) References Cited

U.S. PATENT DOCUMENTS

2008/0318130 A1* 12/2008 Ogawa ................ H01M 4/1391
429/231.95
2011/0281161 A1* 11/2011 Ikeda .................... H01M 4/622
429/211
(Continued)

FOREIGN PATENT DOCUMENTS

| CN | 102487137 A | 6/2012 |
| CN | 102856578 A | 1/2013 |

(Continued)

OTHER PUBLICATIONS

International Search Report for PCT/JP2017/034938 dated Dec. 12, 2017 [PCT/ISA/210].
(Continued)

*Primary Examiner* — Jeremiah R Smith
(74) *Attorney, Agent, or Firm* — Sughrue Mion, PLLC

(57) ABSTRACT

Disclosed is an electrode, comprising: a metal foil; an electrode layer formed on at least one surface of the metal foil; and an insulating layer formed on the electrode layer; wherein boundary portion between the insulating layer and the electrode layer is in a state in which a part of the insulating layer engages into a part of the electrode layer, and Ls/L is 1.25 or more, wherein a reference length of a straight line in a direction in which the metal foil extends is taken as L and a boundary length along boundary between the insulating layer and the electrode layer is taken as Ls.

13 Claims, 7 Drawing Sheets

(52) U.S. Cl.
CPC .. *H01M 10/0525* (2013.01); *H01M 2004/021* (2013.01); *H01M 2004/027* (2013.01); *H01M 2004/028* (2013.01)

(56) References Cited

U.S. PATENT DOCUMENTS

2012/0141877 A1* 6/2012 Choi ................... H01M 50/449
429/246
2012/0300367 A1 11/2012 Chevalier et al.

FOREIGN PATENT DOCUMENTS

| | | |
|---|---|---|
| CN | 103311550 A | 9/2013 |
| JP | 10-265250 A | 10/1998 |
| JP | 2008-234879 A | 10/2008 |
| JP | 2014-127275 A | 7/2014 |
| JP | 2015-222657 A | 12/2015 |
| JP | 2016-36829 A | 3/2016 |
| WO | 2010-89898 A1 | 8/2010 |
| WO | 2013/31211 A1 | 3/2013 |
| WO | 2013/136426 A1 | 9/2013 |
| WO | 2015/147280 A1 | 10/2015 |

OTHER PUBLICATIONS

Chinese Office Action for CN Application No. 201780059656.2 dated May 31, 2021 with English Translation.
Chinese Office Action for CN Application No. 201780059656.2 dated Dec. 30, 2021 with English Translation.

* cited by examiner

ELECTRODE AND SECONDARY BATTERY

CROSS REFERENCE TO RELATED APPLICATIONS

This application is a National Stage of International Application No. PCT/JP2017/034938, filed on Sep. 27, 2017, which claims priority from Japanese Patent Application No. 2016-191994, filed on Sep. 29, 2016.

TECHNICAL FIELD

The present invention relates to an electrode and a lithium ion secondary battery using the same in which at least one surface is coated with an insulating layer, in particular, to an electrode and a secondary battery in which peeling strength of the insulating layer is improved and occurrence of short circuit between the electrodes can be reduced.

BACKGROUND ART

Lithium ion secondary batteries, which feature small size and large capacity, have been widely used as power supplies for electronic devices such as mobile phones and notebook computers and have contributed to enhancing convenience of mobile IT devices. In recent years, larger-scale applications, such as power supplies for driving motorcycles and automobiles and storage cells for smart grids, have attracted attention. As the demand for lithium ion secondary batteries has increased and they have been used in various fields, batteries have been required to have characteristics, such as further higher energy density, lifetime characteristics that can withstand long-term use, and usability under a wide range of temperature conditions.

Regarding electrodes in secondary batteries, various techniques for improving safety with as insulation coat have been proposed and put to practical use. In the case of preparing an active material layer with an insulating layer (inorganic material layer), it is common to apply the active material layer and the insulating layer separately. Meanwhile, a method of sequentially or simultaneously applying two layers has also been proposed. In the case where the active material layer and the insulating layer are formed in separate steps, first, an active material layer which is the first layer is applied, dried and pressure-molded, then an insulating layer which is the second layer is coated, dried and pressure-molded. On the other hand, in the case of sequential or simultaneous coating, the insulating layer is applied after applying the active material layer without drying each time.

Regarding a boundary structure between the active material layer and the insulating layer, Patent Document 1 discloses a structure in which the active material layer has a plurality of concave portions that exist near its surface, wherein a part of the insulating layer engages in the concave portions to thereby improve bonding strength between the insulating layer and the electrode.

In addition, Patent Document 2 discloses a structure in which a coating layer (insulating layer) is formed on a negative electrode active material layer for the purpose of insulation between a positive electrode and a negative electrode, and in which a part of the boundary between the negative electrode active material and the insulating layer includes roughened areas with surface roughness Ra=0.7 μm or more.

CITATION LIST

Patent Document

Patent Document 1: WO2013/136426
Patent Document 2: Japanese Patent Laid-Open No. 2014-127275

SUMMARY OF INVENTION

Technical Problem

In the above-mentioned conventional structure, there are cases in which adhesive strength between the insulating layer and the electrode layer cannot be sufficiently ensured, and thus there is room for further improvement. Accordingly, an objective of the present invention is to provide an electrode and the like in which peeling strength of the insulating layer is improved and occurrence of short circuit between the electrodes can be reduced.

In order to achieve the above object, a battery according to one embodiment of the present invention is as follows:

An electrode, comprising:
a metal foil;
an electrode layer formed on at least one surface of the metal foil; and
an insulating layer formed on the electrode layer;
wherein boundary portion between the insulating layer and the electrode layer is in a state in which a part of the insulating layer engages into a part of the electrode layer, and
Ls/L is 1.25 or more
wherein a reference length of a straight line in a direction in which the metal foil extends is taken as L and a boundary length along boundary between the insulating layer and the electrode layer is taken as Ls.

Advantageous Effects of Invention

According to the present invention, it is possible to provide an electrode or the like in which peeling strength of the insulating layer is improved and occurrence of short circuit between the electrodes can be reduced.

DESCRIPTION OF EMBODIMENTS

1. Basic Structure of Film Covered Battery

Figure 1:
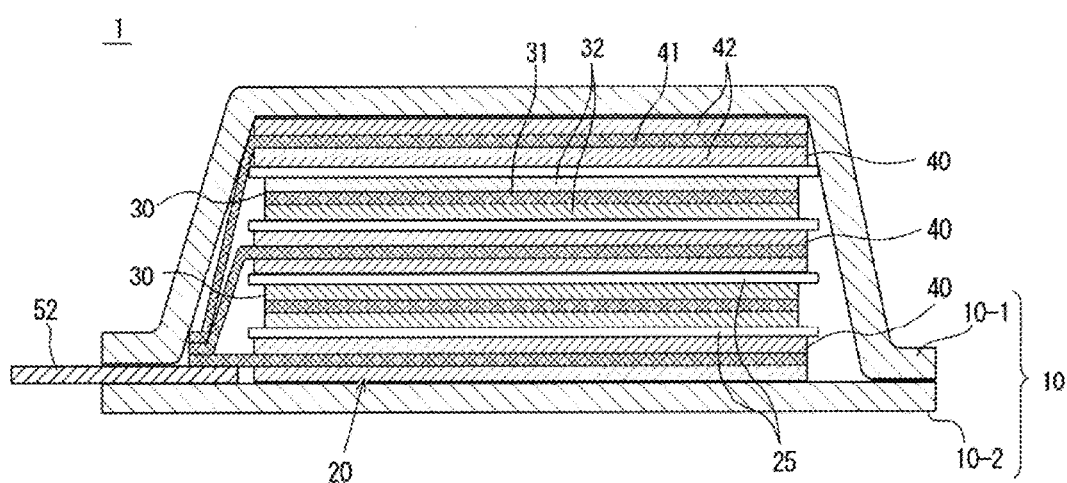
FIG. 1 is a cross-sectional view showing a basic structure of a film-covered battery.

With respect to the basic structure of a film covered battery, explanation will be given by taking a film covered battery with a stacked-type battery element as an example. As shown in FIG. 1, a film covered battery 1 according to one embodiment of the present invention comprises a battery element 20, a film outer package 10 for housing the battery element 20 together with electrolyte, a positive electrode tab and a negative electrode tab (also referred to as just "electrode tab" below. Only the negative electrode tab 52 is shown in FIG. 1). In this example, the film outer package is formed in a shape of bag with two films 10-1 and 10-2 adhered together by heat-sealing.

In the battery element 20, a plurality of positive electrodes 30 and a plurality of negative electrodes 40 are alternately stacked with separators 25 interposed therebetween. In the positive electrode 30, both surfaces of a metal foil 31 have been coated with positive electrode active material layers (electrode layer) 32, and similarly in the negative electrode 40, both faces of a metal foil 41 have been coated with negative electrode active material layers (electrode layer) 42. The whole outer shape of the battery element 20 is, not particularly limited, a substantially flat rectangular parallelepiped. In FIG. 1, illustration of insulating layers to be applied to the positive electrode or the negative electrode are omitted.

2. Structure of Each Part

Embodiments of the present invention will be described for each member of the lithium ion secondary battery.

[Negative Electrode]

Negative electrode has a structure in which a negative electrode active material is applied over a current collector as an integrated negative electrode active material layer by a negative electrode binder. The negative electrode active material is a material capable of reversibly receiving and releasing lithium ions in charging and discharging.

Figure 2:
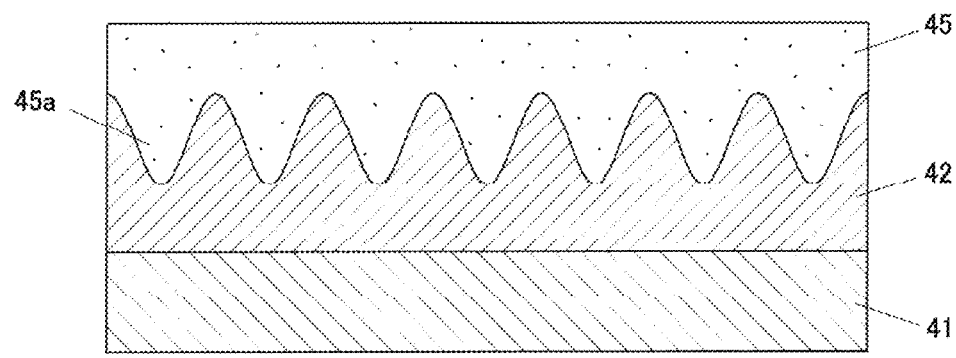
FIG. 2 is a cross-sectional view schematically showing a cross-sectional structure of an electrode (negative electrode) of the present embodiment.

FIG. 2 is a cross-sectional view schematically showing the structure of the negative electrode. In one embodiment of the present invention, a negative electrode active material layer 42 is formed on a metal foil 41 which is a current collector, and an insulating layer 45 is further formed thereon. In the following, an example in which the insulating layer 45 is formed on the negative electrode will be described, but the technical idea of the present invention can be similarly applied to the case where an insulating layer is provided on the positive electrode. In other words, the present invention is applicable to the electrode having a current collector, an electrode layer formed on the current collector, and an insulating layer on the electrode layer, and regarding a kind of an electrode with conductivity, a positive electrode and a negative electrode can be used.

In the present embodiment, the surface area Sa of the surface of negative electrode active material layer 42 (specifically, the boundary portion between the negative electrode active material layer 42 and the insulating layer 45) is considered. In the case where the insulating layer and the negative electrode active material layer including the negative electrode active material are manufactured under the same conditions, it is considered that the adhesion property between the insulating layer and the negative electrode active material layer increases as the surface area Sa increases. However, it is difficult to estimate the surface area Sa in actual electrodes. Therefore, when it is considered that the electrode surface is formed relatively uniformly over the entire electrode surface, it is possible to replace the surface area Sa with a length La of the boundary between the negative electrode active material layer and the insulating layer in a cross-section when cutting the electrode in a direction perpendicular to the electrode surface. In that case, it is considered that as a length La that connects both ends of the boundary between the negative electrode active material layer and the insulating layer is longer than a reference length Lb along a certain straight line parallel to the metal foil, the adhesion property increases. In this specification, the expression "negative electrode active material layer 42" is used, but of course, the layer 42 can contain binder or conductive material and the like in addition to the active material.

Therefore, the boundary between the negative electrode active material layer 42 and the insulating layer 45 is defined by a parameter "L-value". "L-value" is defined as a ratio La/Lb, that is a ratio of the length La of the boundary between active material layer and insulating layer relative to the reference length Lb. It is considered that as the L-value is large; the adhesion property increases since the adhesion area between the insulating layer and the negative electrode active material is larger. Therefore, the L-value is preferably 1.25 or more, more preferably 1.45 or more.

As the "L-value" increases, the surface area of the boundary between the insulating layer and the negative electrode active material layer increases accordingly. Therefore, it is preferable since the risk that the insulating layer peels off the negative electrode active material layer is reduced. However, generally, as the "L-value" increases, the boundary undulates significantly. Therefore, in the configuration where the "L-value" is large, when the electrode surface is formed to be substantially flat, it is not preferable since the thickness of the insulating layer varies significantly. In addition, when the insulating layer is formed to have a constant thickness, it is not preferable since the surface is not flat as an electrode. The upper limit of the L-value is set according to the allowable range.

Figure 3A:
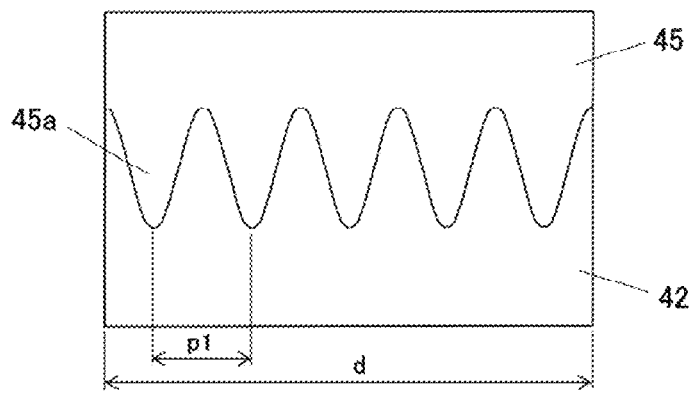
FIGS. 3A and 3B are cross-sectional views schematically showing a cross-sectional structure of an electrode (negative electrode) of the present embodiment (FIG. 3A and cross-sectional view schematically showing a cross-sectional structure of an electrode (negative electrode) of the reference embodiment FIG. 3B).
Figure 3B:
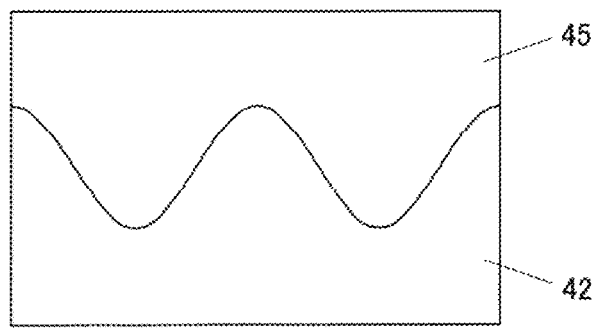

As a parameter that expresses a state of the boundary, the surface roughness Ra is often used. Ra is referred to as an arithmetic average roughness and is defined as an average absolute value of deviation amounts perpendicular to the insulating layer surface in a reference length (here, although it is assumed to be approximately 100 μm to 1 mm, but not limited thereto). That is, FIG. 3(a) and FIG. 3(b) have the same value as Ra. However, when comparing FIG. 3(a) and FIG. 3(b), anchor structure 45a is formed intricately in FIG. 3(a), and higher effect of preventing separation of the insulating layer can be obtained. In that sense, Ra alone is insufficient to express the adhesion state of the boundary.

Also, there are cases where it is insufficient to form anchor structure at just a part of the boundary. For example, when proximal portion of the anchor structure is thin, there is a possibility that the anchor structure is broken because adhesion property cannot be maintained only by the anchor structure. In that sense, it is preferable that the anchor structure exists in every certain range or less.

Assume that the boundary between the insulating layer and the negative electrode active material layer has a certain cyclical structure in an in-plane direction of the layer, average length of the element "RSm" as a parameter representing the period is known. If this value is less than a certain value, there is a possibility that a contact area can be widened, and it is preferably about 40 μm or less, more preferably 30 μm or less.

The average length (RSm) of element at the boundary can be obtained according to JIS-B-0601 (2001). The average length (RSm) represents the average of the lengths between the roughness curve elements per a reference length. That is, in a range of the reference length, provided that the number of peaks of the roughness curve (having a plurality of peaks (here assumed to be local maximum points)) is set to m+1, distances between the respective peaks are W1, W2, W3 . . . Wm, it is a value obtained by dividing the sum of the lengths of W1 to Wm by m as shown in the following formula.

$$RSm = \frac{1}{m}\sum_{i=1}^{m} Wi \quad \text{(Formula 1)}$$

Regarding the lower limit of RSm, it is preferable in terms of uniformity and the like that it is repeated at a cycle as small as possible, so it is not particularly limited. However, by definition, it is thought that it is not smaller than the particle diameter constituting the negative electrode active material layer in the vicinity of the boundary between the insulating layer and the negative electrode active material layer, therefore it is the substantial lower limit value of RSm.

Figure 4:
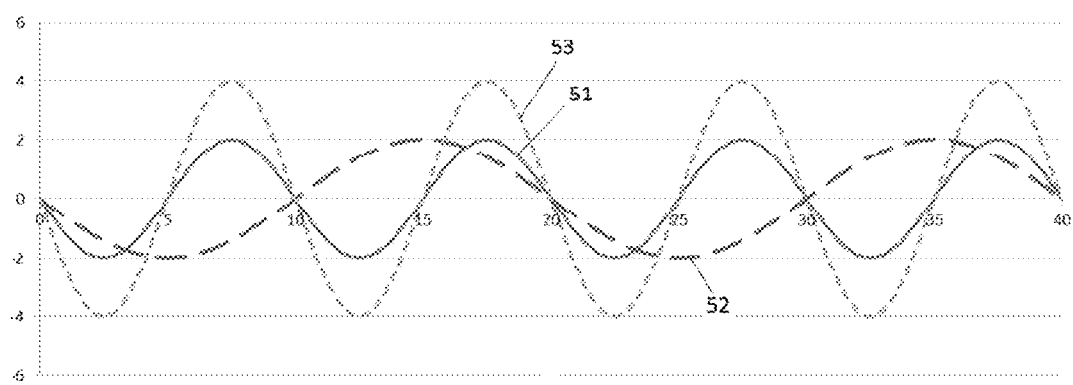
FIG. 4 is a diagram schematically showing some shapes of boundaries between an electrode active material layer and an insulating layer.
Figure 5:
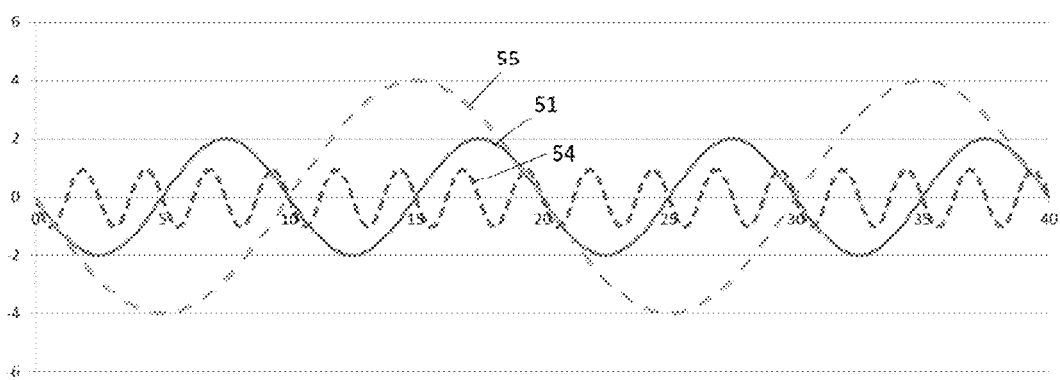
FIG. 5 a diagram schematically showing some shapes of boundaries between an electrode active material layer and an insulating layer.
Figure 6:
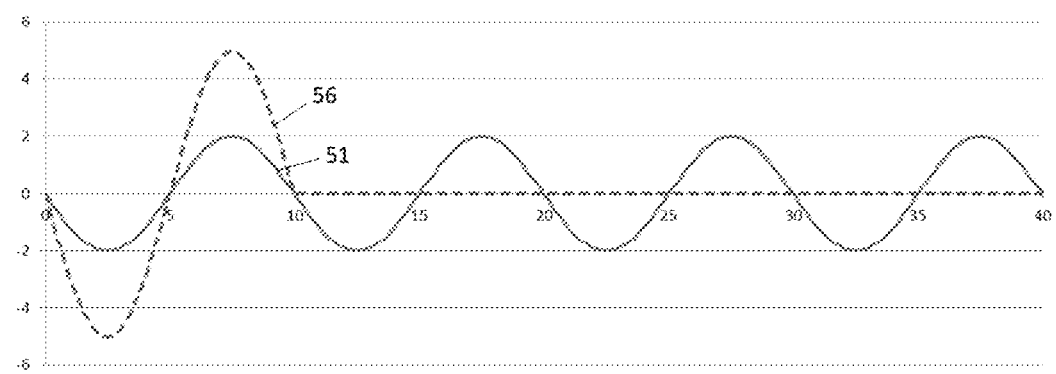
FIG. 6 a diagram schematically showing some shapes of boundaries between an electrode active material layer and an insulating layer.

FIG. 4 to FIG. 6 show schematic boundaries. Numbers such as "51" to "56" indicate schematic boundaries, respectively. Regarding the boundary 51 as a reference, the cycle of the boundary 52 is doubled, the amplitude of the boundary 53 is doubled, the boundary 54 has a ¼ cycle and a ½ amplitude, and the boundary 55 has doubled cycle and amplitude.

In the above case, Table 1 shows the results of approximately calculated "L-value", "RSm" and "Ra" as shown above.

TABLE 1

|         | 51   | 52   | 53   | 54   | 55   |
|---------|------|------|------|------|------|
| L-value | 1.32 | 1.09 | 1.95 | 1.94 | 1.32 |
| RSm     | 10   | 20   | 10   | 2.5  | 20   |
| Ra      | 1.27 | 1.27 | 2.54 | 0.62 | 2.54 |

Based on the results, the following can be understood. Ra is a parameter that significantly depends on the amplitude of the boundary and does not depend so much on the cycle. On the other hand, RSm is a parameter that significantly depends on the cycle and does not depend on the amplitude. Considering these facts, L-value directly represents the length of the boundary part, so it is considered to be appropriate as an index showing adhesion property.

On the other hand, Table 2 shows the approximately calculated result in a configuration in which the anchor structure exists only in a part as shown by boundary 56 in FIG. 6 and the other parts indicate a constant value cyclically.

TABLE 2

|         | 51   | 56   |
|---------|------|------|
| L-value | 1.32 | 1.33 |
| RSm     | 10   | 40   |
| Ra      | 1.27 | 0.79 |

As such, the boundary 56 has approximately the same L-value, but the flat boundary occupies ¾ of the whole. In such a case, when peeling of the insulating layer occurs at the time of abnormality, there is a risk that when the peeling occurs at a flat boundary the entire insulating layer could peel off from the peeled area as a starting point. Therefore, in addition to the L-value, a parameter with cyclic property is also useful.

Based on the above, it is considered that setting the upper limit value for the RSm value in addition to the L-value leads to provide a higher range in which effect of preventing peeling of the insulating layer can be obtained. In addition, an electrode having an active material layer with an insulating layer produced based thereon can improve the peeling strength of the insulating layer.

In the case of forming an insulating layer on the active material, it can be used as an electrode for a battery both on the positive electrode active material layer and on the negative electrode active material layer. Generally, when manufacturing a battery, since the area of the negative electrode is larger than that of the positive electrode, application of an insulating layer in the negative electrode active material layer can reduce the number of steps for manufacturing the battery necessary for reducing the risk of short-circuiting between positive and negative electrodes.

In one embodiment of the present invention, the negative electrode includes a metal and/or a metal oxide and carbon as the negative electrode active material. Examples of the metal include Li, Al, Si, Pb, Sn, In, Bi, Ag, Ba, Ca, Hg, Pd, Pt, Te, Zn, La, and alloys of two or more of these. These metals or alloys may be used as a mixture of two or more. In addition, these metals or alloys may contain one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as the negative electrode active material, and silicon oxide is more preferably contained. This is because silicon oxide is relatively stable and hardly causes reaction with other compounds. Also, for example, 0.1 to 5 mass % of one or more elements selected from nitrogen, boron and sulfur can be added to the metal oxide. In this way, the electrical conductivity of the metal oxide can be improved.

Examples of the carbon include graphite, amorphous carbon, diamond-like carbon, carbon nanotube, and composites of these. Highly crystalline graphite has high electrical conductivity and is excellent in adhesiveness with respect to a negative electrode current collector made of a metal such as copper and voltage flatness. On the other hand, since amorphous carbon having a low crystallinity has a relatively small volume expansion, it has a high effect of alleviating the volume expansion of the entire negative electrode, and deterioration due to nonuniformity such as crystal grain boundaries and defects hardy occurs.

The metal and the metal oxide have the feature that the capacity of accepting lithium is much larger than that of carbon. Therefore, the energy density of the battery can be improved by using a large amount of the metal and the metal oxide as the negative electrode active material. In order to achieve high energy density, it is preferable that the content ratio of the metal and/or the metal oxide in the negative electrode active material is high. Metals and/or metal oxides are mixed into the negative electrode such that lithium acceptable amount of the carbon contained in the negative electrode is less than the lithium releasable amount of the positive electrode. In the present specification, the lithium releasable amount of the positive electrode and the lithium acceptable amount of the carbon contained in the negative electrode means the theoretical capacities, respectively. The ratio of the lithium acceptable amount of carbon contained in the negative electrode with respect to the lithium releasable amount of the positive electrode is preferably 0.95 or less, more preferably 0.9 or less, and more preferably 0.8 or less. As the amount of the metal and/or the metal oxide increases, it is preferable because the capacity of the negative electrode as a whole increases. The metal and/or the metal oxide is preferably contained in the negative electrode in an amount of 0.01 mass % or more of the negative electrode active material, more preferably 0.1 mass % or more, and further preferably 1 mass % or more. However, the metal and/or the metal oxide has large volume change upon absorbing and desorbing of lithium as compared with carbon, and electrical junction may be lost. Therefore, the amount of the metal and/or the metal oxide in the negative active material is 99 mass % or less, preferably 90% or less, more preferably 80 mass % or less. As described above, the negative electrode active material is a material capable of reversibly absorbing and desorbing lithium ions with charge and discharge in the negative electrode and does not include other binder and the like.

Examples there of the negative electrode include polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, acrylic, polyimide, polyamide imide and the like. In addition to the above, styrene butadiene rubber (SBR) and the like can be included. When an aqueous binder such as an SBR emulsion is used, a thickener such as carboxymethyl cellulose (CMC) can also be used. The amount of the negative electrode binder to be used is preferably 0.5 to 20 parts by mass relative to 100 parts by mass of the negative electrode active material from the viewpoint of a trade-off between enough binding strength and high energy. The negative electrode binders may be mixed and used.

The negative electrode active material can be used together with the conductive auxiliary material. Concretely, as the conductive auxiliary material, the same ones as specifically exemplified in the positive electrode can be used, and the amount used can be the same as well.

As the negative electrode current collector, aluminum, nickel, copper, silver and an alloy thereof are preferably used from the viewpoint of electrochemical stability. Examples of the current collector shape include a foil shape, a flat plate shape and a mesh shape.

The negative electrode can be produced, for example, by forming a negative electrode active material layer containing a negative electrode active material and a negative electrode binder on a negative electrode current collector. Examples of a method for forming the negative electrode active material layer include a doctor blade method, a die coater method, a CVD method, a sputtering method, and the like. After forming the negative electrode active material layer in advance, a thin film of aluminum, nickel or an alloy thereof may be formed by a method such as vapor deposition, sputtering or the like to obtain a negative electrode current collector.

[Positive Electrode]

The positive electrode refers to an electrode on the high potential side in a battery. As an example, the positive electrode includes a positive electrode active material capable of reversibly absorbing and desorbing lithium ions with charge and discharge and has a structure in which a positive electrode active material is laminated on a current collector as a positive electrode active material layer integrated with a positive electrode binder. In one embodiment of the present invention, the positive electrode has a charge capacity per unit area of 3 mAh/cm² or more, preferably 3.5 mAh/cm² or more. From the viewpoint of safety and the like, the charge capacity per unit area of the positive electrode is preferably 15 mAh/cm² or less. Here, the charge capacity per unit area is calculated from the theoretical capacity of the active material. That is, the charge capacity of the positive electrode per unit area is calculated by (theoretical capacity of the positive electrode active material used for the positive electrode)/(area of the positive electrode). Note that the area of the positive electrode refers to the area of one surface, not both surfaces of the positive electrode.

In order to increase the energy density of the positive electrode, the positive electrode active material used for the positive electrode preferably accepts and releases lithium and is a compound with higher capacity. Examples of the high-capacity compound include nickel lithate (LiNiO₂) and a lithium nickel composite oxide obtained by partially replacing Ni of nickel lithate with another metal element, and a layered lithium nickel composite oxide represented by formula (A) below is preferable.

$$Li_yNi_{(1-x)}M_xO_2 \qquad (A)$$

(provided that 0≤x<1, 0<y≤1, and M is at least one element selected from the group consisting of Co, Al, Mn, Fe, Ti, and B.)

As a compound represented by the formula (A), the Ni content is preferably high, or that is to say, x is less than 0.5 in formula (A), and more preferably 0.4 or less. Examples of such compounds include $Li_\alpha Ni_\beta Co_\gamma Mn_\delta O_2$ (0<α≤1.2, preferably 1≤α≤1.2, β+γ+δ=1, β≥0.7, and γ≤0.2) and $Li_\alpha Ni_\mu Co_\gamma Al_\delta O_2$ (0<α≤1.2 preferably 1≤α≤1.2, β+γ+δ=1, β≥0.6 preferably β≥0.7, γ0.2), and, in particular, $LiNi_\beta Co_\gamma Mn_\delta O_2$ (0.75≤β≤0.85, 0.05≤γ≤0.15, 0.10≤δ≤0.20). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ can be preferably used.

From the viewpoint of heat stability, it is also preferable that the Ni content does not exceed 0.5, or that is to say, x is 0.5 or more in formula (A). It is also preferable that a certain transition metal does not account for more than half. Examples of such compounds include $Li_\alpha Ni_\beta Co_\gamma Mn_\delta O_2$ (0<α≤1.2 preferably 1α≤1.2, β+γ+δ=1, 0.2≤β≤0.5, 0.1≤γ≤0.4, 0.1≤δ≤0.4). More specific examples include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (provided that these compounds include those in which the content of each transition metal is varied by about 10%).

Also, two or more compounds represented by formula (A) may be used as a mixture, and, for example, it is also preferable to use NCM532 or NCM523 with NCM433 in a range of 9:1 to 1:9 (2:1 as a typical example) as a mixture. Moreover, a battery having a high capacity and a high heat stability can be formed by mixing a material having a high Ni content (x is 0.4 or less) with a material having a Ni content not exceeding 0.5 (x is 0.5 or more, such as NCM433) in formula (A).

Other than the above positive electrode active materials, examples include lithium manganates having a layered structure or a spinel structure, such as $LiMnO_2$, $Li_xMn_2O_4$ (0<x<2), $Li_2MnO_3$, and $Li_xMn_{1.5}Ni_{0.5}O_4$ (0<x<2); $LiCoO_2$ and those obtained by partially replacing these transition metals with other metals; those having an excess of Li based on the stoichiometric compositions of these lithium transition metal oxides; and those having an olivine structure such as $LiFePO_4$. Moreover, materials obtained by partially replacing these metal oxides with Al, Fe, P, Ti, Si, Pb, Sn, In, Bi, Ag, Ba, Ca, Hg, Pd, Pt, Te, Zn, La, or the like can be used as well. One of the positive electrode active materials described above may be used singly, or two or more can be used in combination.

A positive electrode binder similar to the negative electrode binder can be used. Among them, polyvinylidene fluoride or polytetrafluoroethylene is preferable from the viewpoint of versatility and low cost, and polyvinylidene fluoride is more preferable. The amount of the positive electrode binder used is preferably 2 to 15 parts by mass relative to 100 parts by mass of the positive electrode active material from the viewpoint of a trade-off between "sufficient binding strength" and "high energy".

An electroconductive auxiliary material may be added to a coating layer containing the positive electrode active material for the purpose of lowering the impedance. Examples of the conductive auxiliary material include flaky, sooty, fibrous carbonaceous microparticles and the like such as graphite, carbon black, acetylene black, vapor grown carbon fiber (for example, VGCF manufactured by Showa Denko K.K.) and the like.

A positive electrode current collector similar to the negative electrode current collector can be used. In particular, as the positive electrode, a current collector using aluminum, an aluminum alloy, iron, nickel, chromium, molybdenum type stainless steel is preferable.

Like the negative electrode, the positive electrode can be made by forming a positive electrode active material layer containing a positive electrode active material and a binder for a positive electrode on a positive electrode current collector.

[Insulating Layer]

The insulating layer can be formed by applying a slurry composition for an insulating layer so as to cover a part of the active material layer of the positive electrode or the negative electrode and drying and removing a solvent.

A slurry for the insulating layer is a slurry composition for forming a porous insulating layer. Therefore, the insulating layer can also be referred to as an insulating layer with porosity (porous insulating layer). The slurry for the insulating layer comprises non-conductive particles and a binder having a specific composition, and the non-conductive particles, the binder and optional components are uniformly dispersed as a solid content in a solvent.

It is desirable that the non-conductive particles stably exist in the use environment of the lithium ion secondary battery and are electrochemically stable. As the non-conductive particles, for example, various inorganic particles, organic particles and other particles can be used. Among them, inorganic oxide particles or organic particles are preferable. From the viewpoint of less contamination of metal ion in the particles (it may be expressed as metallic foreign substance in the following.), it is more preferable to use organic oxide particles. Metal ions in the particles sometimes form salts near the electrode, which may cause an increase in the internal resistance of the electrode and a decrease in cycle characteristics of the secondary battery. The other particles include particles to which insulation is given by surface treatment of the surface of fine powder with a non-electrically conductive substance. The fine powder can be made from a conductive metal, compound and oxide such as carbon black, graphite, $SnO_2$, and metal powder.

Two or more of the above-mentioned particles may be used in combination as the non-conductive particles.

Examples of the inorganic particles include inorganic oxide particles such as aluminum oxide, silicon oxide, magnesium oxide, titanium oxide, $BaTiO_2$, ZrO, alumina-silica composite oxide; inorganic nitride particles such as aluminum nitride and boron nitride; covalent crystal particles such as diamond and the like; sparingly soluble ionic crystal particles such as barium sulfate, calcium fluoride, barium fluoride and the like; clay fine particles such as talc and montmorillonite. These particles may be subjected to element substitution, surface treatment, solid solution treatment, etc., if necessary, and may be used singly or in combination of two or more kinds. Among them, inorganic oxide particles are preferable from the viewpoints of stability in the electrolytic solution and potential stability.

The shape of the inorganic particles is not particularly limited, and may be spherical, needle-like, rod-like, spindle-shaped, plate-like, or the like. From the viewpoint of effectively preventing penetration of the needle-shaped object, the shape of the inorganic particle may be in the form of a plate.

By orienting the inorganic particles as described above, it is conceivable that the inorganic particles are arranged so as to overlap with each other on a part of the flat surface, and voids (through holes) from one surface to the other surface of the porous film are formed not in a straight but in a bent shape (that is, the curvature ratio is increased). This is presumed to prevent the lithium dendrite from penetrating the porous film and to better suppress the occurrence of a short circuit.

The average particle diameter of the inorganic particles is preferably in the range of 0.005 to 10 µm, more preferably 0.1 to 5 µm, particularly preferably 0.3 to 2 µm. When the average particle size of the inorganic particles is in the above range, the dispersion state of the porous film slurry is easily controlled, so that it is easy to manufacture a porous film having a uniform and pre-determined thickness. In addition, such average particle size provides the following advantages. The adhesion to the binder is improved, and even when the porous film is wound, it is possible to prevent the inorganic particles from peeling off, and as a result, enough safety can be achieved even if the porous film is thinned. Since it is possible to suppress an increase in the particle packing ratio in the porous film, it is possible to suppress a decrease in ion conductivity in the porous film. Furthermore, the porous membrane can be made thin.

The average particle size of the inorganic particles can be obtained by arbitrarily selecting 50 primary particles from an SEM (scanning electron microscope) image in an arbitrary field of view, carrying out image analysis, and obtaining the average value of circle equivalent diameters of each particle.

The particle diameter distribution (CV value) of the inorganic particles is preferably 0.5 to 40%, more preferably 0.5 to 30%, particularly preferably 0.5 to 20%. By setting the particle size distribution of the inorganic particles within the above range, a predetermined gap between the non-conductive particles is maintained, so that it is possible to suppress an increase in resistance due to the inhibition of movement of lithium. The particle size distribution (CV value) of the inorganic particles can be determined for example by observing the inorganic particles with an electron microscope, measuring the particle diameter of 200 or more particles, determining the average particle diameter and the standard deviation of the particle diameter, and calculating (standard deviation of particle diameter)/(average particle diameter). The larger the CV value means the larger variation in particle diameter.

The BET specific surface area of the inorganic particles used in one embodiment of the present invention is specifically preferably 0.9 to 200 $m^2/g$, and more preferably 1.5 to 150 $m^2/g$ from the viewpoint of suppressing the aggregation of the inorganic particles and optimizing the flowability of the insulating layer slurry described later.

When the solvent contained in the slurry for insulating layer is a non-aqueous solvent, a polymer dispersed or dissolved in a non-aqueous solvent can be used as a binder. As the polymer dispersed or dissolved in the non-aqueous solvent, polyvinylidene fluoride (PVdF), polytetrafluoroethylene (PTFE), polyhexafluoropropylene (PHFP), polytrifluoroethylene chloride (PCTFE), polyperfluoroalkoxyfluoroethylene, polyimide, polyamideimide, and the like can be used as a binder, and it is not limited thereto.

In addition, a binder used for binding the mixture layer can be used.

When the solvent contained in the slurry for insulating layer is an aqueous solvent (a solution using water or a mixed solvent containing water as a main component as a dispersion medium of the binder), a polymer dispersed or dissolved in an aqueous solvent can be used as a binder. A polymer dispersed or dissolved in an aqueous solvent includes, for example, an acrylic resin. As the acrylic resin, it is preferably to use homopolymers obtained by polymerizing monomers such as acrylic acid, methacrylic acid, acrylamide, methacrylamide, 2-hydroxyethyl acrylate, 2-hydroxyethyl methacrylate, methyl methacrylate, ethylhexyl acrylate, butyl acrylate. The acrylic resin may be a copolymer obtained by polymerizing two or more of the above monomers. Further, two or more of the homopolymer and the copolymer may be mixed. In addition to the above-mentioned acrylic resin, polyolefin resins such as styrene butadiene rubber (SBR) and polyethylene (PE), polytetrafluoroethylene (PTFE), and the like can be used. These polymers can be used singly or in combination of two or more kinds. Among them, it is preferable to use an acrylic resin. The form of the binder is not particularly limited, and particles in the form of particles (powder) may be used as they are, or those prepared in a solution state or an emulsion state may be used. Two or more kinds of binders may be used in different forms.

The insulating layer may contain a material other than the above-described inorganic filler and binder, if necessary. Examples of such material include various polymer materials that can function as a thickener for a slurry for the insulating layer, which will be described later. When an aqueous solvent is used, it is preferable to contain a polymer functioning as the thickener. As the polymer functioning as the thickener, carboxymethyl cellulose (CMC) or methyl cellulose (MC) is preferably used.

Although not particularly limited, the ratio of the inorganic filler (the total amount of the inorganic filler in the part on the separator side and the part on the electrode side surface) to the entire insulating layer is suitably about 70 mass % or more (for example, 70 mass % to 99 mass %), preferably 80 mass % or more (for example, 80 mass % to 99 mass %), and particularly preferably about 90 mass % to 99 mass %.

The ratio of the binder in the insulating layer is suitably about 30 mass % or less, preferably 20 mass % or less, more preferably 10 mass % or less (for example, 0.5 to 3 mass %). In the case of containing an insulating layer-forming component other than the inorganic filler and the binder, for example, a thickener, the content ratio of the thickener is preferably about 3 mass % or less, more preferably about 2 mass % or less. If the ratio of the binder is too small, strength (shape retentivity) of the insulating layer itself is lowered, which may cause defects such as cracking and peeling. If the ratio of the binder is too large, gaps between the particles of the insulating layer become insufficient, and the ion permeability in the insulating layer may decrease in some cases.

(Forming of Insulating Layer)

A method of forming the insulating layer will be described. As a material for forming the insulating layer, a paste type material (including slurry form or ink form, the same applies below) mixed and dispersed with an inorganic filler, a binder and a solvent can be used.

A solvent used for the insulating layer slurry includes water or a mixed solvent mainly containing water. As a solvent other than water constituting such a mixed solvent, one or more kinds of organic solvents (lower alcohols, lower ketones, etc.) which can be uniformly mixed with water can be appropriately selected and used. Alternatively, it may be an organic solvent such as N-methylpyrrolidone (NMP), pyrrolidone, methyl ethyl ketone, methyl isobutyl ketone, cyclohexanone, toluene, dimethylformamide, dimethylacetamide, or a combination of two or more thereof. The content of the solvent in the slurry for the insulating layer is not particularly limited, and it is preferably 40 to 90 mass %, particularly preferably about 50 mass %, of the entire coating material.

The operation of mixing the inorganic filler and the binder with the solvent can be carried out by using a suitable kneading machine such as a ball mill, a homodisper, and an ultrasonic dispersing machine.

For the operation of applying the slurry for the insulating layer, conventional general coating means can be used without restricting. For example, a predetermined amount of the slurry for the insulating layer can be applied by coating in a uniform thickness by means of a suitable coating device (a gravure coater, a slit coater, a die coater, a dip coater, etc.).

Thereafter, the solvent in the slurry for the insulating layer may be removed by drying the applied material with suitable drying means (typically at a temperature lower than the melting point of the separator, for example 110° C. or less, for example, 30 to 80° C.).

Electrode for a lithium ion secondary battery having the insulating layer can be prepared according to the following method. In preparing the positive electrode and the negative electrode, firstly, an active material layer in a rectangular area as an example is applied to a long metal foil as a current collector. Then, insulating layer in a rectangular area as an example is applied to cover the active material layer.

Regarding the rectangular area coated with the active material and the rectangular area coated with the insulating layer, the area coated with the insulating layer may be formed larger or smaller.

Next, the electrode coated with the active material and the insulating layer is dried and press-molded.

Although the method of successively conducting the applying step of the active material layer and the applying step of the insulating layer is disclosed here, it is also possible to perform them at the same time. Further, it is also possible to carry out the applying of each layer separately and perform drying and pressure-molding separately.

The method according to one embodiment of the present invention can measure even an electrode manufactured by a method of sequentially or simultaneously performing applying steps of an active material and a coating step of an insulating layer, in the same manner.

Furthermore, in a process in which the applying of the active material layer and the coating of the insulating layer are performed on both sides of the current collector and drying is carried out simultaneously, in general, it is considered that adhesion between the active material layer and the insulating layer becomes stronger, when the binder of the active material layer and the insulating layer are partially mixed near the boundary or when binding occurs between the binders. In terms of improving adhesion, in this process, it is preferable to use the same solvent for the active material layer and the insulating layer, and it is more preferable to use the same binder material.

3. Other Components

[Battery]

By assembling the electrodes according to the present embodiment, a battery can be obtained. For example, the battery may have a configuration in which positive electrodes and negative electrodes are formed as an electrode according to the present embodiment, the separators are sandwiched between them, and it is enclosed with an electrolytic solution in an outer packaging bag.

[Assembled Battery]

A plurality of lithium ion secondary batteries according to the present embodiment can be assembled to form an assembled battery. For example, two or more lithium ion secondary batteries according to the present embodiment may be used, and the assembled battery may be configured to be connected in series, parallel, or both. By connecting in series and/or parallel, capacitance and voltage can be adjusted freely. The number of lithium ion secondary batteries provided in the assembled battery can be appropriately set according to the battery capacity and output.

[Vehicle]

The lithium ion secondary battery or the assembled battery according to the present embodiment can be used in a vehicle. Examples of vehicles according to the present embodiment include hybrid vehicles, fuel cell vehicles, electric vehicles (both including four-wheel vehicles (commercial vehicles such as passenger cars, trucks, buses, light vehicles, etc.), motorcycles (motorcycles) and tricycles). Incidentally, the vehicle according to the present embodiment is not limited to an automobile but may be used as a power source for other vehicles, for example, a moving subject such as a train.

[Power Storage Device]

The lithium ion secondary battery or the assembled battery according to the present embodiment can be used for a power storage device. Examples of the power storage device according to the present embodiment include a power storage device connected between a commercial power supply to be supplied to an ordinary household and a load such as a household appliance and used as a backup power source or auxiliary power when a power failure occurs. In addition, there are also those used for large-scale power storage for stabilizing the power output with large time-variation due to renewable energy such as solar power generation.

[Others]

Further, the lithium-ion secondary battery or the battery pack according to the present embodiment can be used as a power source of a mobile device such as a mobile phone, a notebook computer, and the like.

EXAMPLES

Next, the present invention will be described with reference to specific examples. However, the present invention is not limited to the following examples.

(Preparation of Insulation Coat Electrode)

Example 1

Graphite and polyvinylidene fluoride (PVdF) as a binder were dispersed in N-methyl-2-pyrrolidone at a weight ratio of 95:5 to prepare a slurry for a negative electrode active material. Subsequently, alumina and polyvinylidene fluoride (PVdF) were dispersed in N-methyl-2-pyrrolidone at a weight ratio of 90:10 to prepare a slurry for an insulating layer. These two slurries were applied to the surface of the negative electrode current collector foil made of copper in the order of the slurry for the negative electrode active material layer and the slurry for the insulating layer. Thereafter, it was dried to form a negative electrode active material layer and an insulating layer. Similarly, a negative electrode active material layer and an insulating layer were formed on the back surface of the negative electrode current collector foil. Subsequently, the negative electrode current collector foil, the negative electrode active material layer and the insulating layer as a whole were press-molded.

Example 2

$LiNi_{0.8}Mn_{0.15}Co_{0.05}O_2$, a carbon conductive agent (acetylene black), and polyvinylidene fluoride (PVdF) as a binder were dispersed in N-methyl-2-pyrrolidone at a weight ratio of 90:5:5 to prepare a slurry for positive electrode active material layer. Subsequently, alumina and polyvinylidene fluoride (PVdF) as a binder were dispersed in N-methyl-2-pyrrolidone at a weight ratio of 90:10 to prepare a slurry for an insulating layer. These were applied to the surface of the positive electrode current collector foil made of aluminum in the order of the positive electrode active material layer slurry and the insulating layer slurry. Thereafter, it was dried to form a positive electrode active material layer and an insulating layer. Similarly, a positive electrode active material layer and an insulating layer were formed on the back surface of the positive electrode current collector foil. Finally, the positive electrode current collector foil, the positive electrode active material layer and the insulating layer as a whole were press-molded.

Comparative Example 1

Graphite, carboxymethyl cellulose as a thickener and styrene butadiene rubber as a binder were mixed in an aqueous solution at a weight ratio of 97:1:2 to prepare a slurry for a negative electrode active material layer. Subsequently, alumina and polyvinylidene fluoride (PVdF) as a binder were dispersed in N-methyl-2-pyrrolidone at a weight ratio of 90:10 to prepare a slurry for an insulating layer. This was applied to the surface of a negative electrode current collector foil made of copper and dried to form a negative electrode active material layer. Similarly, a negative electrode active material layer was formed on the back surface of the negative electrode current collector foil and thereafter press-molded. Next, in the same manner as in Example 1, a slurry for an insulating layer was prepared. This was applied to the negative electrode active material layer and dried to form an insulating layer. Similarly, an insulating layer was formed on the negative electrode active material layer on the back side of the negative electrode current collector foil. Subsequently, the negative electrode current collector foil, the negative electrode active material layer and the insulating layer as a whole were press-molded.

(Parameter Calculation)

Figure 7:
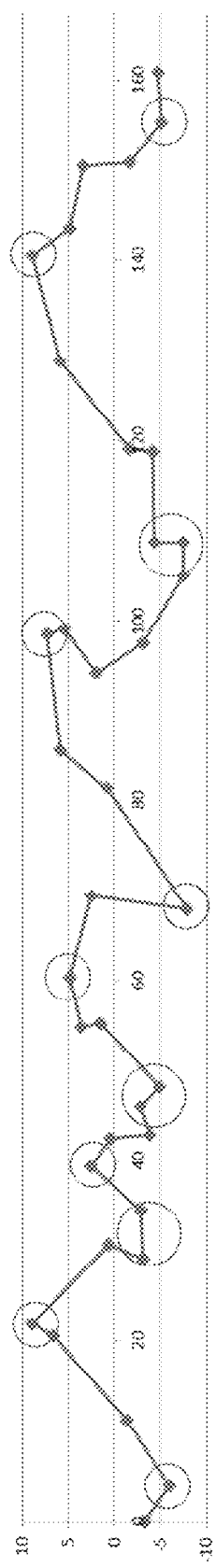
FIG. 7 is a diagram schematically showing a result of approximating a shape of a boundary between an electrode active material layer and an insulating layer as a broken line.

Next, for each of the electrodes prepared in Examples 1 to 3, a plurality of sectional SEM images were measured. From the image, the boundary between the insulating layer and the electrode active material layer was approximated with a polygonal line and extracted, and "L-value", RSm and Ra were calculated. The result obtained from these multiple images are shown in Table 3. Results calculated from a plurality of images obtained from electrodes by the same manufacturing method are indicated by adding -1, -2, etc. to the end ("Example 1-1", "Example 1-2" are parameters obtained by analyzing SEM images of different portions of one electrode). As shown in FIG. 7 as an example, the extraction by the polygonal line of the boundary is carried out by extracting a plurality of feature points in the boundary (in this case, the reference length 160 μm was approximated by 36 points). RSm and the like were calculated on the presupposition that there are 11 points (marked with circles; i.e. 5.5 cycles present in the 160 μm length) in FIG. 7 that indicate approximate maximum or minimum in the approximate curve of the boundary).

TABLE 3

|  | L-value | RSm(μm) | Ra(μm) |
| --- | --- | --- | --- |
| Example 1-1 | 1.49 | 29 | 4.3 |
| Example 1-2 | 1.60 | 24 | 4.0 |
| Example 2-1 | 1.36 | 25 | 2.4 |
| Example 2-2 | 1.44 | 40 | 3.0 |
| Comparative Example 1-1 | 1.12 | 69 | 1.1 |
| Comparative Example 1-2 | 1.14 | 42 | 2.7 |
| Comparative Example 1-3 | 1.24 | 50 | 2.5 |

(Simple Peeling Test)

Next, the following simple peeling test was performed on the electrodes obtained in Examples 1 to 4 and Comparative Example 1. Prepare a cellophane tape (width 18 mm) and Kapton (registered trademark) tape (width 10 mm) as a tape, paste them on the surface, then peel them off. Further, whether the insulating layer or the active material layer adheres to the tape was observed. In the case of adhesion, whether the insulating layer was peeled off or the active material layer peeled off was observed by accessing the color. The results are shown in Table 4. In the range of this example, the results were consistent with cellophane tape and Kapton (registered trademark) tape.

TABLE 4

|  | Simple Peeling Test Result |
| --- | --- |
| Example 1 | OK |
| Example 2 | OK |
| Comparative Example 1 | NG |

Here, OK indicates the electrode layer sticks to the tape together with the insulating layer almost over the entire surface, or only a part of the insulating layer was peeled off, and almost the insulating layer and electrode layer remained in the portion where the tape adhered. NG indicates that the insulating layer alone sticks to the tape and is nearly white, while the sample side showed a black color which is the color of the electrode layer (that is, the electrode layer was exposed on the surface). In other words, OK indicates that the adhesion between the insulating layer and the electrode layer was improved, therefore the electrode layer was broken earlier, or the adhesion between the insulating layer and the electrode layer is improved, and the electrode layer or the boundary between the electrode layer and the current collector was strongly adhered. On the other hand, NG is considered that peeling off occurred from the boundary between the insulating layer and the electrode layer because adhesion of the boundary between the insulating layer and the electrode layer was insufficient.

As is evident from Tables 3 and 4, it was impossible to distinguish between ranges of OK and NG with the value of Ra, however, the adhesiveness between the insulating layer and the electrode layer is improved in the almost entire sample in which the L-value shown in the present application is 1.25 or more. In addition, when the RSm is 40 μm or less, the adhesiveness between the insulating layer and the electrode layer can be improved. It is considered that the anchor shapes are inserted at appropriate intervals.

SUPPLEMENTARY NOTE

Present application discloses the following inventions. The symbols in parentheses are for reference only and do not limit the present invention at all:

1. An electrode, comprising:
    a metal foil (41);
    an electrode layer (42) formed on at least one surface of the metal foil; and
    an insulating layer (45) formed on the electrode layer;
    wherein boundary portion between the insulating layer and the electrode layer is in a state in which a part of the insulating layer engages into a part of the electrode layer, and
    Ls/L is 1.25 or more
    wherein a reference length of a straight line in a direction in which the metal foil extends is taken as L and a boundary length along boundary between the insulating layer and the electrode layer is taken as Ls.
2. The electrode as described above, characterized in that provided that an average length of elements at the boundary between the insulating layer and the electrode layer is RSm, the RSm is 40 μm or less.
3. The electrode as described above, characterized in that the RSm is 30 μm or less.
4. The electrode as described above, characterized in that Ls/L is 1.45 or more.
5. The electrode as described above, wherein the electrode layer is a negative electrode active material layer.
6. A secondary battery, comprising:
    an electrode (referred to as a first electrode) as described above;
    a second electrode with different polarity from that of the first electrode; and
    an electrolyte.

EXPLANATION OF SYMBOLS

1 film exterior battery
10 film outer package
20 battery element
25 separator
30 positive electrode
31 metal foil
32 positive electrode active material layer
40 negative electrode
41 metal foil
42 negative electrode active material layer
45 insulating layer
45 anchor structure

The invention claimed is:

1. An electrode, comprising:
   a metal foil;
   an electrode layer formed on at least one surface of the metal foil; and
   an insulating layer formed on the electrode layer;
   wherein the electrode layer includes a lithium nickel composite oxide which is a positive electrode active material and is obtained by partially replacing Ni of nickel lithate (LiNiO$_2$) with another metal element, and polyvinylidene fluoride (PVdF) which is a binder,
   wherein the insulating layer includes alumina particles, and polyvinylidene fluoride (PVdF) which is a binder,
   wherein a boundary portion between the insulating layer and the electrode layer is in a state in which a part of the insulating layer engages into a part of the electrode layer,
   Ls/L is 1.25 or more
   wherein a reference length of a straight line in a direction in which the metal foil extends is taken as L and a boundary length along the boundary between the insulating layer and the electrode layer is taken as Ls,
   RSm is from 24 to 40 μm
   wherein an average length of elements at the boundary between the insulating layer and the electrode layer is taken as RSm, and
   wherein the lithium nickel composite oxide is represented by one or more of the following formula (i) to (iii):

$$Li_\alpha Ni_\beta Co_\gamma Mn_\delta O_2 \quad (i),$$

wherein in formula (i), $1 \le \alpha \le 1.2$, $\beta+\gamma+\delta=1$, $\beta \ge 0.7$, and $\gamma \le 0.2$;

$$Li_\alpha Ni_\beta Co_\gamma Al_\delta O_2 \quad (ii),$$

wherein in formula (ii), $1 \le \alpha \le 1.2$, $\beta+\gamma+\delta=1$, $\beta \ge 0.7$, and $\gamma \le 0.2$;

$$LiNi_\beta Co_\gamma Mn_\delta O_2 \quad (iii),$$

wherein in formula (iii), $0.75 \le \beta \le 0.85$, $0.05 \le \gamma \le 0.15$, $0.10 \le \delta \le 0.20$.

2. The electrode according to claim 1, characterized in that the RSm is 24 μm to 30 μm.

3. The electrode according to claim 1, characterized in that Ls/L is 1.45 or more.

4. The electrode according to claim 1, wherein an average particle diameter of the alumina particles is 0.005 to 10 μm.

5. A secondary battery, comprising:
   a positive electrode according to claim 1;
   a negative electrode; and
   an electrolyte.

6. The secondary battery according to claim 5, wherein an average particle diameter of the alumina particles is 0.005 to 10 μm.

7. An electrode, comprising:
   a metal foil;
   an electrode layer formed on at least one surface of the metal foil; and
   an insulating layer formed on the electrode layer;
   wherein the electrode layer includes graphite which is a negative electrode active material, and polyvinylidene fluoride (PVdF) which is a binder,
   wherein the insulating layer includes alumina particles, and polyvinylidene fluoride (PVdF) which is a binder, and
   wherein a boundary portion between the insulating layer and the electrode layer is in a state in which a part of the insulating layer engages into a part of the electrode layer,
   Ls/L is 1.25 or more
   wherein a reference length of a straight line in a direction in which the metal foil extends is taken as L and a boundary length along the boundary between the insulating layer and the electrode layer is taken as Ls, and
   RSm is from 24 to 40 μm
   wherein an average length of elements at the boundary between the insulating layer and the electrode layer is taken as RSm.

8. The electrode according to claim 7, characterized in that the RSm is 24 μm to 30 μm.

9. The electrode according to claim 7, characterized in that Ls/L is 1.45 or more.

10. The electrode according to claim 7, wherein the electrode layer is a negative electrode active material layer.

11. The electrode according to claim 7, wherein an average particle diameter of the alumina particles is 0.005 to 10 μm.

12. A secondary battery, comprising:
    a positive electrode;
    a negative electrode according to claim 7; and
    an electrolyte.

13. The secondary battery according to claim 12, wherein an average particle diameter of the alumina particles is 0.005 to 10 μm.

* * * * *